(12) United States Patent
DeSimone et al.

(10) Patent No.: US 7,969,435 B1
(45) Date of Patent: Jun. 28, 2011

(54) METHOD FOR MODIFYING ANY MODELED SURFACE AS A LOFTED SURFACE

(75) Inventors: Frank DeSimone, Carlisle, MA (US); Daniel Dean, Acton, MA (US); Dima Feinhaus, Newton, MA (US)

(73) Assignee: SpaceClaim Corporation, Inc., Concord, MA (US)

( * ) Notice: Subject to any disclaimer, the term of this patent is extended or adjusted under 35 U.S.C. 154(b) by 887 days.

(21) Appl. No.: 11/937,926

(22) Filed: Nov. 9, 2007

(51) Int. Cl.
*G06T 17/00* (2006.01)

(52) U.S. Cl. ........ 345/420; 345/419; 345/424; 345/441; 345/442; 700/182; 703/2; 706/919; 715/964

(58) Field of Classification Search .................. 345/419, 345/420, 441, 424, 442; 473/117, 330; 703/2; 706/919; 700/182; 715/964
See application file for complete search history.

(56) References Cited

U.S. PATENT DOCUMENTS

| | | | | |
|---|---|---|---|---|
| 5,581,672 A | * | 12/1996 | Letcher, Jr. | ................... 345/420 |
| 5,627,949 A | * | 5/1997 | Letcher, Jr. | ................... 345/420 |
| 5,856,828 A | * | 1/1999 | Letcher, Jr. | ................... 345/420 |
| 6,963,824 B1 | * | 11/2005 | Davidson et al. | ................. 703/2 |
| 7,010,472 B1 | * | 3/2006 | Vasey-Glandon et al. | ........ 703/6 |
| 2002/0015036 A1 | * | 2/2002 | Shiroyama et al. | ........... 345/419 |
| 2005/0062740 A1 | * | 3/2005 | Tobita et al. | ................... 345/427 |
| 2008/0303810 A1 | * | 12/2008 | Bae et al. | ....................... 345/419 |

OTHER PUBLICATIONS

Hsu et al. "Automated Shape Modification for the CAD Model of Residual Limb". Published 2002.*
Hsu et al. "An Algorithm to Construct the CAD Model of a Residual Limb". Published 2001.*

* cited by examiner

*Primary Examiner* — Kimbinh T Nguyen
(74) *Attorney, Agent, or Firm* — Wilmer Cutler Pickering Hale and Dorr LLP

(57) ABSTRACT

A three-dimensional object modeling tool is described that can derive the 2D cross sections of one or more lofted or unlofted surfaces, allowing those surfaces to be modified instantly. The modeling tool (loft tool) includes sub-tools for selecting a surface, moving a 2D section, editing a 2D section, creating a 2D section, and removing a 2D section. By analysis of the selected lofted surface and its faces, the loft tool can derive an appropriate number of 2D cross section to present to the user for manipulation. When deriving the 2D cross section the modeling tool operates by simplifying the curves making up the lofted surface, and from these can generate 2D cross section that can be easily manipulated and used to instantly update the lofted surface and redisplay it for further user modification.

20 Claims, 19 Drawing Sheets

METHOD FOR MODIFYING ANY MODELED SURFACE AS A LOFTED SURFACE

BACKGROUND OF THE INVENTION

1. Field of the Invention

This invention relates to modifying a geometry-only lofted surface, and more specifically to deriving, and the directly manipulating the 2D sections of such a lofted surface in an intuitive manner.

2. Prior Art

Objects in a CAD system can be represented in a parameter based way or in a geometry based way. In a parameter based representation, the object is modeled as an object along with a set of features and history that define the object. In a geometry based way the object is simply represented as a set of geometric data.

In Modern CAD systems geometry can be created in three basic ways: from manipulation of 2D sections, creation of edge features by modifications to the sharp boundaries between faces (e.g. a fillet), and combining and manipulating solid primitives using a set of Boolean operations. One method of creating 3D geometry from 2D sections is lofting. A 3D loft is created by generating a surface as it passes through multiple 2D sections. Alternatively such surface can be called a "blended surface," or "blend."

During the design, engineering, and manufacturing of parts, engineers often have to modify a part with a lofted surface once it has been created in three-dimensional modeling software. For example, a lofted surface might need to be changed slightly for aesthetic reasons, or a cylindrical shaft may need to have its center narrowed to fit amongst other parts in an assembly. In existing three-dimensional parametric modeling system modeling systems a lofted surface can only be modified within the same system. Further, even within those systems, once users subtract from a lofted part so that only a portion of the loft remains, users are unable to modify the loft in the context of their subtractions.

Another limitation is the inability to change an unlofted surface into a lofted surface. Because a lofted surface is created as a specific, recipe-based feature, users have to find the feature in the history, delete it, recreate it as a lofted part, and ensure that later dependencies are maintained. This is a time consuming and error-prone process that requires the re-calculation of all features within the part; and, more often than not, requires rebuilding multiple features in the part.

When editing a previously created lofted surface in a parametric system, the process requires step-by-step creation via curves in space, create the blend, etc. Then to modify the blend/loft, you have to roll back later changes, make the change, and then go back to the current step. This is a consequence of parametric systems having added many history features on top of the actual geometry modeling functionality. These systems have interwoven these features into the software so that making changes requires a lot of effort and additional steps to maintain the information in the step-by-step history. Specifically, they require that you edit the particular historical step that parameterized the object instead of changing the object itself. This method requires that the user modify a feature of an object only when the object is in the same state that it was in when the feature was created.

To create a simple loft in a parametric modeling system, the user creates a "feature recipe." First, the user must create at least three planes, defining that there is a certain, equal number of units between each plane. The user selects these planes to begin the process of creating a lofted surface. The user sketches on each of the three planes to create the 2D sections that will be used to generate the loft. The user also defines relationships between the sketches on one plane and the sketches on another plane (such as to offset the sketch on the first plane by 2 units from the sketch on the second plane, and ensure that the sketch on the third plane is the same size as the sketch on the first plane).

Once the sketches have been created, the user indicates that they want to create a loft between the sketches on the three planes, and the loft is generated for them. To create the loft, the user must specify the start point, the type of loft (parallel, in this case), and any other constraints on the loft. The permanently-stored "feature recipe" for the loft now consists of seven features (three planes, three sketches, and one loft) and the constraints and relationships on each feature.

FIG. 19 details how lofted surfaces are modified in the prior art, and shows the difficulty in modifying a lofted surface having a history and feature and recipe. At step 1902, the user select a set of faces of the lofted object. At step 1904, the system decides if the lofted object is a spline or analytic object. For a lofted object defined as a spline, at step 1906 the system determines the dominant direction from a surface representation. Similarly, at step 1908, for an analytic surface, the system determines the dominant direction of the lofted object by face juxtaposition. Next, at step 1910, the parametric curves in u-v space for the lofted surface are created.

If the user edits or recreates a feature of the recipe that was used to create the lofted surface, then at step 1912 all the features that contributed to the recipe must be regenerated, including all the features that followed the recipe. The user may find that this regeneration has failed, and therefore he must analyze each step of the feature recipe to see what caused the failure. During this analysis, the user may realize that the a sketch he modified is constrained by another sketch on a different plane. After a constraint like this is edited, the loft can be regenerated. As another example, if the user wants to slightly rotate the one of the planes originally created at step 1902, the regeneration will also fail. The user may find that the loft was created as a parallel loft, and therefore to rotate one of the planes of the lofts, the entire lofted object must be deleted, and regenerated as a rotational loft.

At step 1914, the user can edit the mathematical u-v curves directly, and these changes can be regenerated into a new lofted. Similarly, at step 1916, if a user warps the face of the loft, the response of the system is to create tessellated representation of all the faces of the loft.

Methods used to overcome these problems parametric modeling systems are not viable for engineering and manufacturing applications. One method of modifying a lofted surface without relying on feature recipes and all the associate constraints, is the use of deformation tools. Deformation tools deconstruct models into constituent triangles and points, losing the 2D sections that define the precise, dimensioned measurements necessary for the accurate engineering and manufacturing of parts. The vertices and orientation of each of the constituent triangles can then be modified as desired to change to overall geometry of the object. After modifications to the triangles however, the original lofted surface cannot be recreated. Similarly, when modifying lofts with morph tools, as Maya, produced by Alias Systems Corporation, and 3DS Max, produced by Autodesk, the original loft surface cannot be recreated. Modifying lofted surfaces with morph tools also causes them to lose their precise dimensioned geometry and measurements necessary for accurate engineering and manufacturing. Therefore, modifications made using a morph tools are more difficult to manufacture, and cannot be successfully imported back into the original modeling software for further modification.

What is needed is an improved method of modifying a lofted surface that allows users to modify any lofted surface created in any three-dimensional modeling software in a simple and efficient manner, while seeing the lofted geometry in the context of any user-created geometry. What is also needed is a way to change any existing unlofted surface into a lofted surface.

SUMMARY

Methods and system for modifying a geometry-only lofted surface, and more specifically to deriving, and the directly manipulating the 2D sections of such a lofted surface in an intuitive manner are described. Embodiments of the invention can also be used to modify as a lofted surface an unlofted object. In one embodiment of the invention, the method for modifying a geometry-only format lofted surface comprises receiving a selection of at least one face of a geometry-only lofted surface from a user, and determining the dominant direction of the lofted surface based on the at least one selected face. The method further comprises converting a plurality of u-v curves defining the lofted surface to a plurality of x-y-z curves, and simplifying those plurality of x-y-z curves into simplified 3D curves. The non-planar simplified curves are then planarized into simplified 3D curves. The simplified 3D curves being used generate a plurality of 2D cross sections from each of the planar simplified 3D curves and the lofted surface. A user can use the 2D cross section to modify the lofted surface.

The simplified 3D curves that are derived can be lines, arcs, or splines. The curves can be simplified by sampling a plurality of points on the x-y-z curve and comparing the plurality of points against at least one of a line, arc, and spline. The process of planarizing 3D curves can be done by calculating a closest plane to each of the non-planar simplified 3D curves.

DETAILED DESCRIPTION

Embodiments of the invention allow any lofted object to be modified in a simple and intuitive manner. Lofted objects can be modified regardless if they were originally created as a lofted object or if they were imported from another CAD system.

In one embodiment, the invention is a loft tool within a three-dimensional modeling system. The tool can be used to modify a lofted surface, or create a lofted surface from unlofted sections. When modifying a lofted surface, the tool, given any lofted surface or portions of a lofted surface, derives the 2D cross sections for re-creating the loft. Then, modification of these 2D sections allows the modification of the loft in a simple and intuitive manner. The tool also lets new 2D sections be added, allowing lofts to be created from any modeled surface, without the need to completely rebuild the object or deal with various constraints of the modeled object.

The loft tool can also be used to create a new lofted surface from a set of sections. Another method to create a lofted object, if starting with an already modeled surface. Regardless of whether it began as a lofted surface, it can be analyzed, and sections derived, so that it can be modified as a lofted surface.

The simple and intuitive method of modifying a lofted surface is possible because the modeling system used with the loft tool does not maintain a level of history information on top of the geometry information and can therefore show geometry changes immediately. The moment a user adjusts a sketch of a section forming part of a lofted object, the program regenerates the lofted object using the modified sketch. Similarly, when rotating a sketch as the sketch is being tilted, the program regenerates the lofted object using the modified orientation of the plane.

Figure 1:
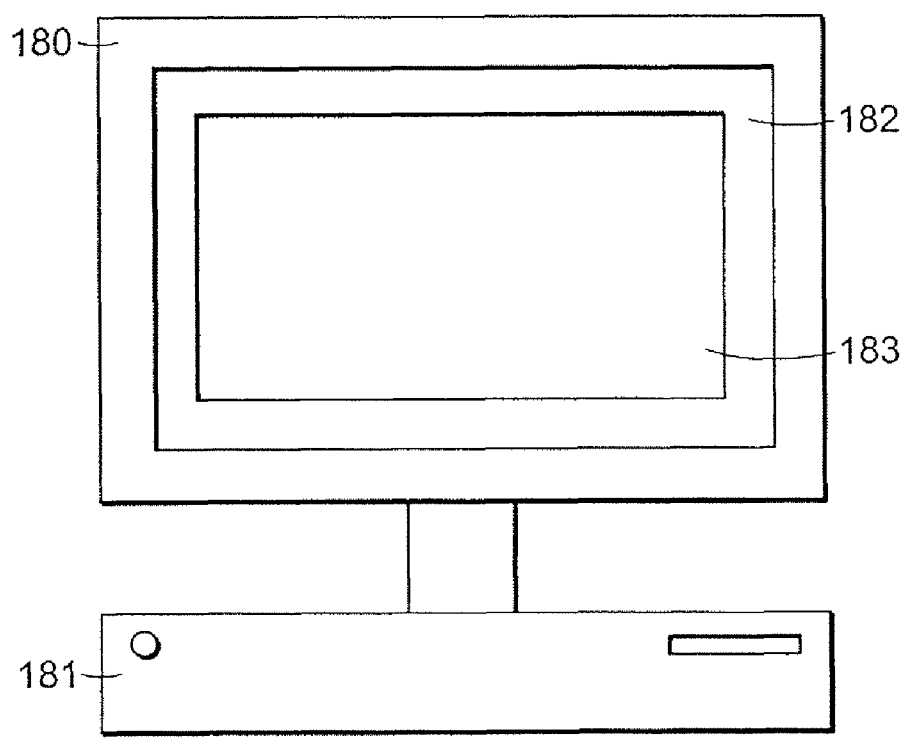
FIG. 1 shows a computer system on which embodiments of the loft tool in accordance with embodiment of the invention can be implemented.

FIG. 1 shows a computer system capable of implementing embodiments of the invention. The system includes a computer 181 containing memory and a processor running a standard operating system 182. Running within the operating system 182 is a user level application 183, such as a modeling system that includes a loft tool in accordance with embodiments of the invention. The operating system and the modeling system are displayed on the monitor 180.

Computer 181 can also have a network interface card and be connected to other computers, servers, and/or storage service. To interface with modeling system 183 a mouse (not shown) or other input device can be used. In detail, one example of a computer system capable of running the loft tool is a computer system running Microsoft Windows XP with Service Pack 2 or Windows Vista operating systems. The computer system has a video card, such as those provided by Radeon, NVIDIA, or AMD, with Full DirectX 9c hardware support and 64 MB or more of graphics memory, Pixel shader 2.0 hardware support, 32 bits/pixel, and 1024×768 minimum resolution. The computer system can have a Pentium 4 2.0 GHz or Athlon 2000+ or faster processor, a 32-bit (×86) or 64-bit (×64) processor. The computer system can have between 512 MB and 4 GB of RAM. The system can also have 2 GB of available disk space, a CD/DVD drive, Microsoft Internet Explorer 5.5 or higher, and a 2 button+ wheel mouse.

Figure 2:
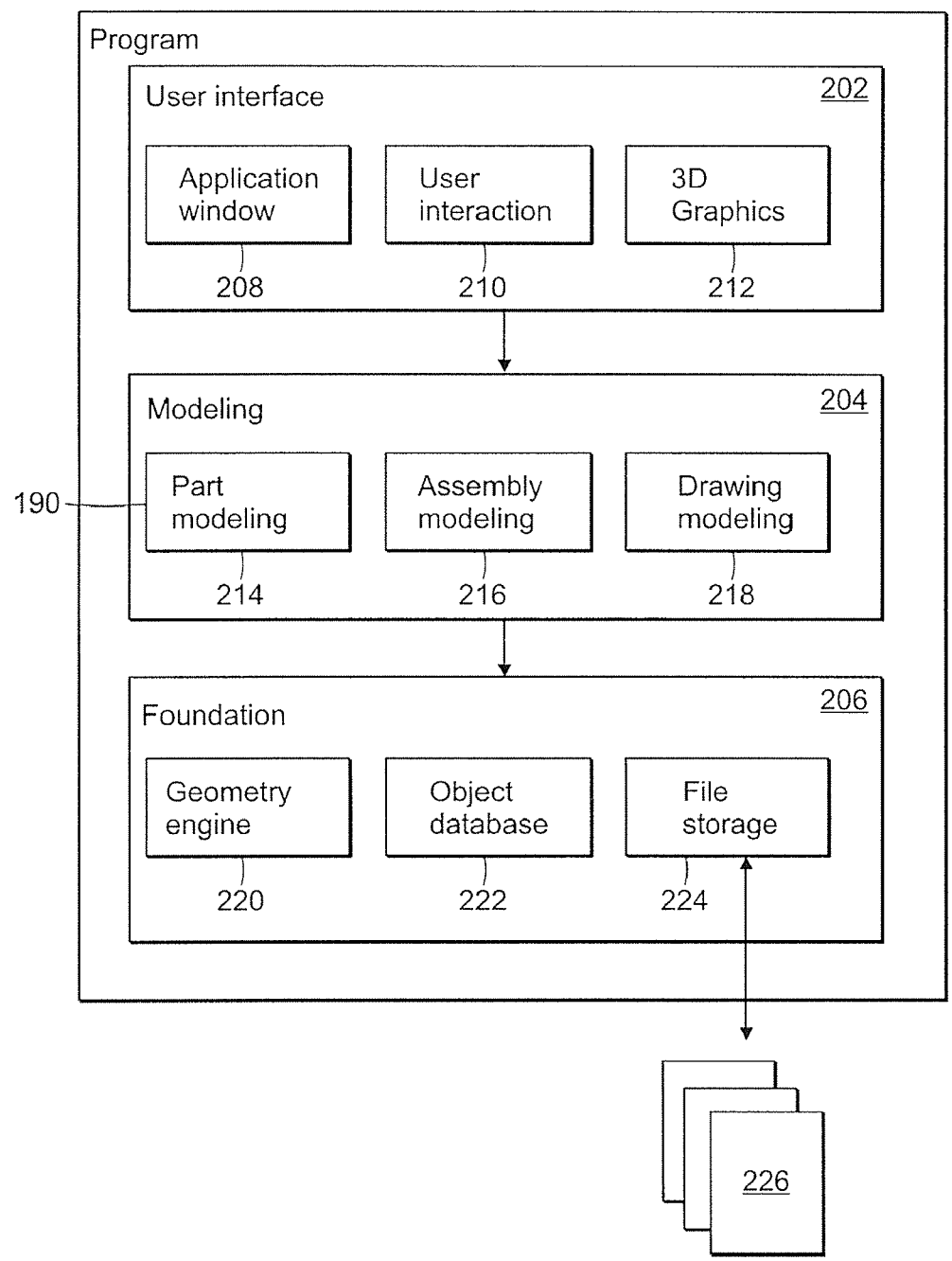
FIG. 2 shows the overall architecture of the modeling system and loft tool.

FIG. 2 is an overall architecture diagram of the structure of the loft tool within the modeling system in accordance with embodiments of the invention. It is made up of a user interface layer 202, a modeling layer 204, and a foundation layer 206. The user interface layer interacts with the user, the modeling layer embodies logic associated with the loft tools and other tools of the modeling system, and the foundation layer provides geometry modeling and other file services.

The user interface layer 202 is made of an application window 208, which contains the loft tool widget, and other interface components common to modeling tools that allow a user to interact with the modeling system. It also contains the standard window manipulation features.

User interaction component 210 includes the loft tool widget, and other standard tools for selecting objects, viewing objects in different ways, or obtaining information about objects. Essentially, the user interface layer provides a way for the user to work with the geometry model and the geometry engine, the output of which is displayed on the monitor 180 using a 3D graphics engine 212. 3D graphics engine 212 renders geometry models to the application window 208 for interaction and manipulation by the user. This functionality can be provided by DirectX.

The Modeling layer 204 provides the logic and algorithms that underlie the commands and tools in the user interface. It communicates with the Geometry Engine 220 based on user actions to display the geometry created by the user actions. The Geometry engine is a known component capable of performing calculations on objects. One geometry engine compatible with embodiments of the invention is the ACIS geometry engine from Spatial Corporation, although other geometry engines with similar capabilities may also be used. Further details of the ACIS geometry engine are provided in Corney, J and Lim, T, 3D Modeling with ACIS, Stirling, UK, which is hereby incorporated by reference in its entirety.

Modeling layer is made up of part modeling component 214, assembly modeling component 216, and drawing modeling component 218. The Part Modeling component 214 manages CAD objects and houses creation and manipulation algorithms in the area of 3D solids and 2D sections and sketches. The part modeling component is responsible for creating and modifying lofted surfaces in accordance with the operation of the loft tool.

The Assembly Modeling component 216 manages CAD objects and algorithms for assembly component instantiation and placement, mating conditions, and the ability to do part modeling in the context of an assembly. Assemblies are user-created collections of parts. These assemblies can include parts with lofted surfaces.

The Drawing Modeling component 218 manages CAD objects and algorithms for creating multi-sheet drawings, drawing views, and drawing annotations. Drawings are 2D representations of 3D objects meant to be printed on paper in standard engineering sizes and formats.

The Foundation layer provides a software platform along used to support higher level layers of the application. The Geometry Engine 220 supports the creation and modification of geometry and topology, and provides algorithms for solid modeling and geometric solving. The Object Database component 222 manages the temporary, in-memory representation of CAD objects, providing a unified framework for inter-object references, undo actions, and associative updates. The File Storage component 224 provides persistent storage of CAD objects within document files 226, along with inter-document relationships, such as assembly-component relationships or drawing-format relationships.

Figure 3:
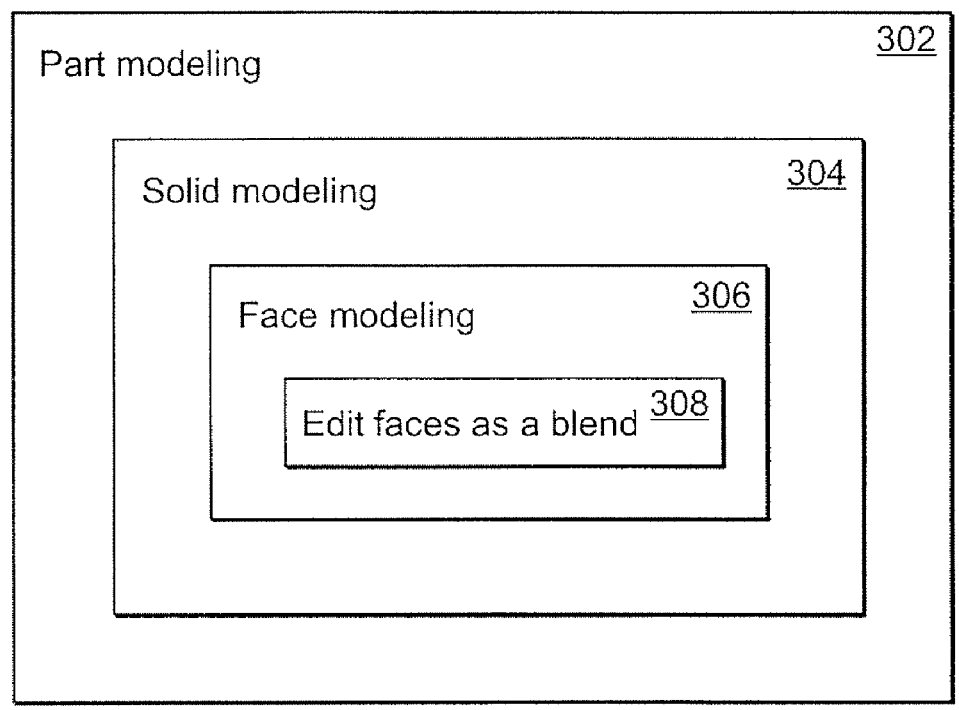
FIG. 3 shows the detailed architecture of the components that contain the loft tool.

FIG. 3 shows the hierarchy of object modeling components to faces in accordance with the design of the loft tool. In the program, objects are modeled in the part modeling components 302 which has the necessary algorithms for management and manipulation of objects. Within the part modeling component is solid modeling component 304 which is responsible for the management and manipulation of solid objects. Solid objects are composed of a set of faces that enclose a volume. Unlike parametric, feature-based CAD systems, which make up the majority of the current systems, embodiments of the invention works directly on the face geometry. Face modeling component 306 incorporates a variety of tools and algorithms that are used to manipulate faces directly. Finally, edit faces as blend component 308 is a subset of face modeling components and contains the algorithms, including embodiments of the invention, for working with lofted surfaces.

Figure 4:
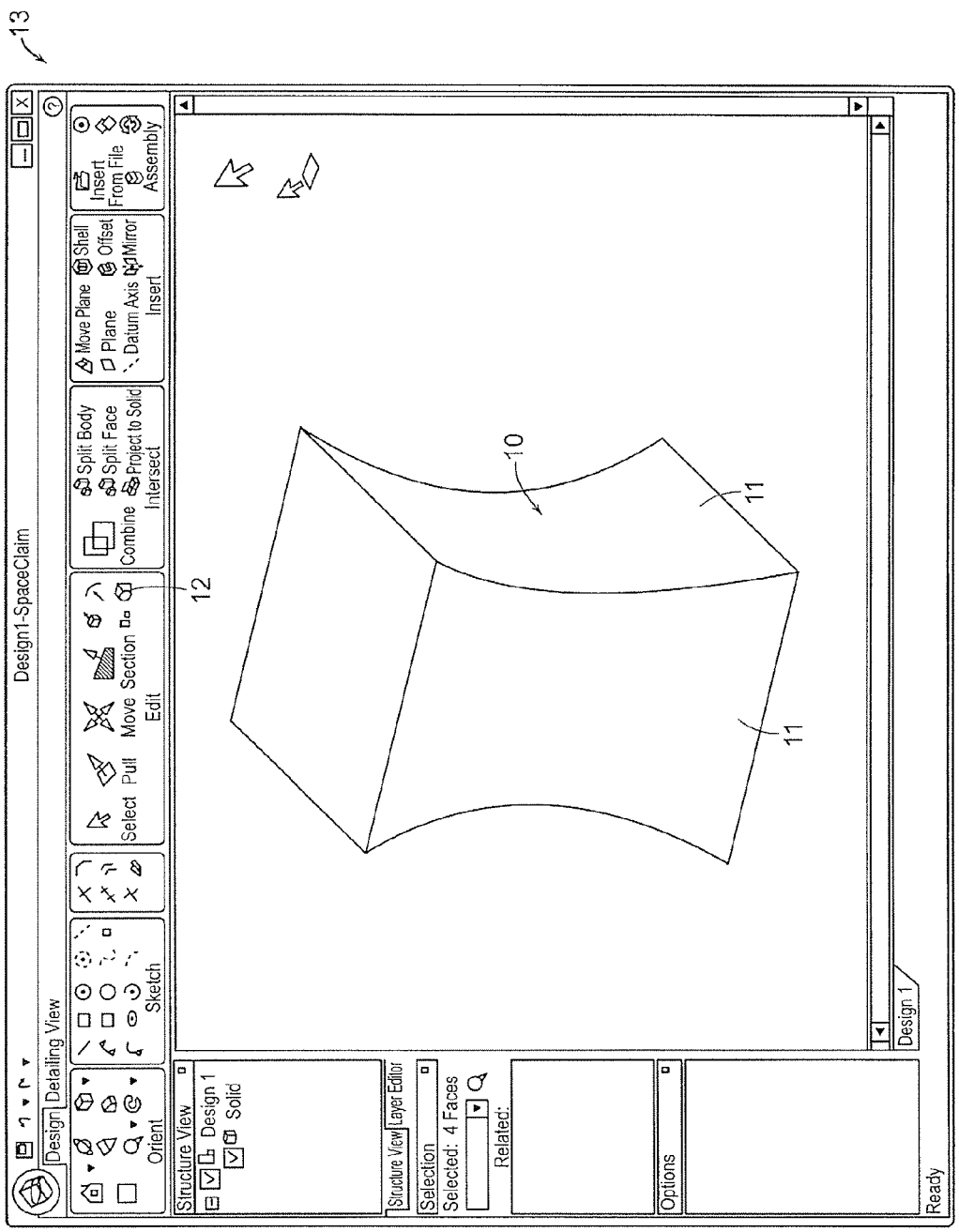
FIG. 4 shows a three-dimensional modeling software application containing the loft tool and displaying lofted surfaces.
Figure 5:
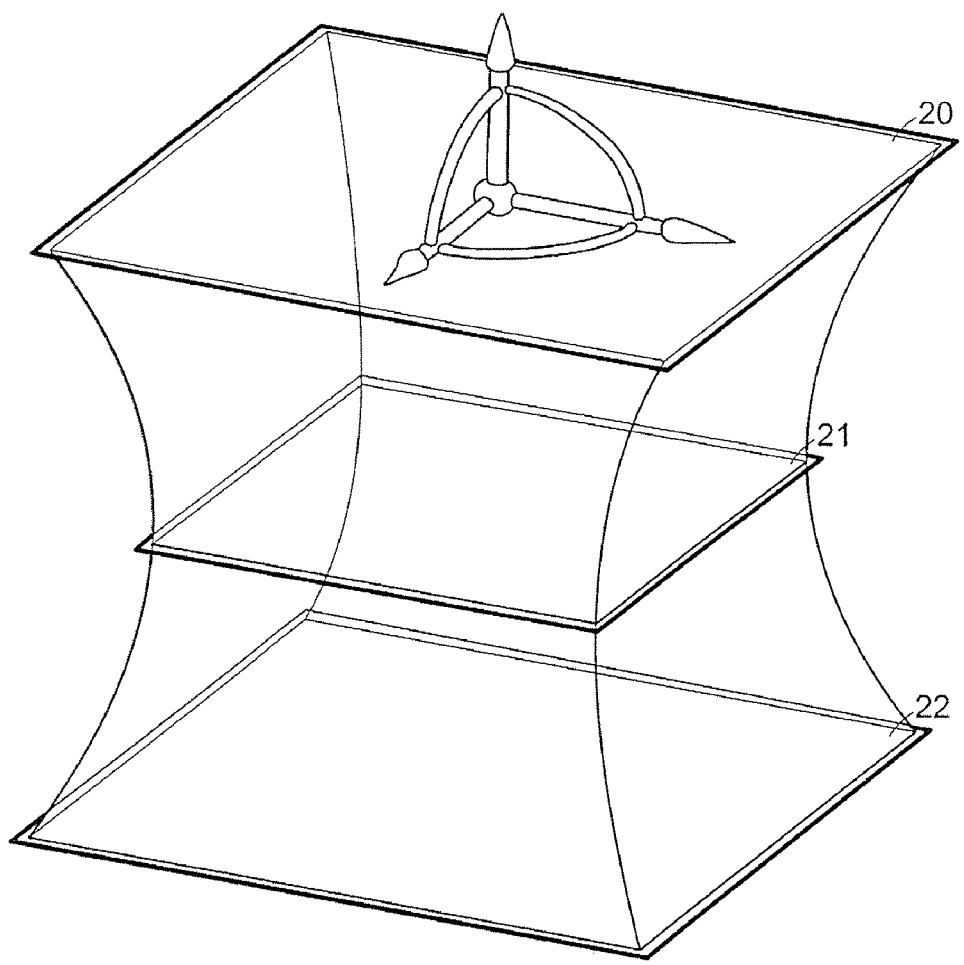
FIG. 5 shows the 2D cross sections derived by the tool.
Figure 6:
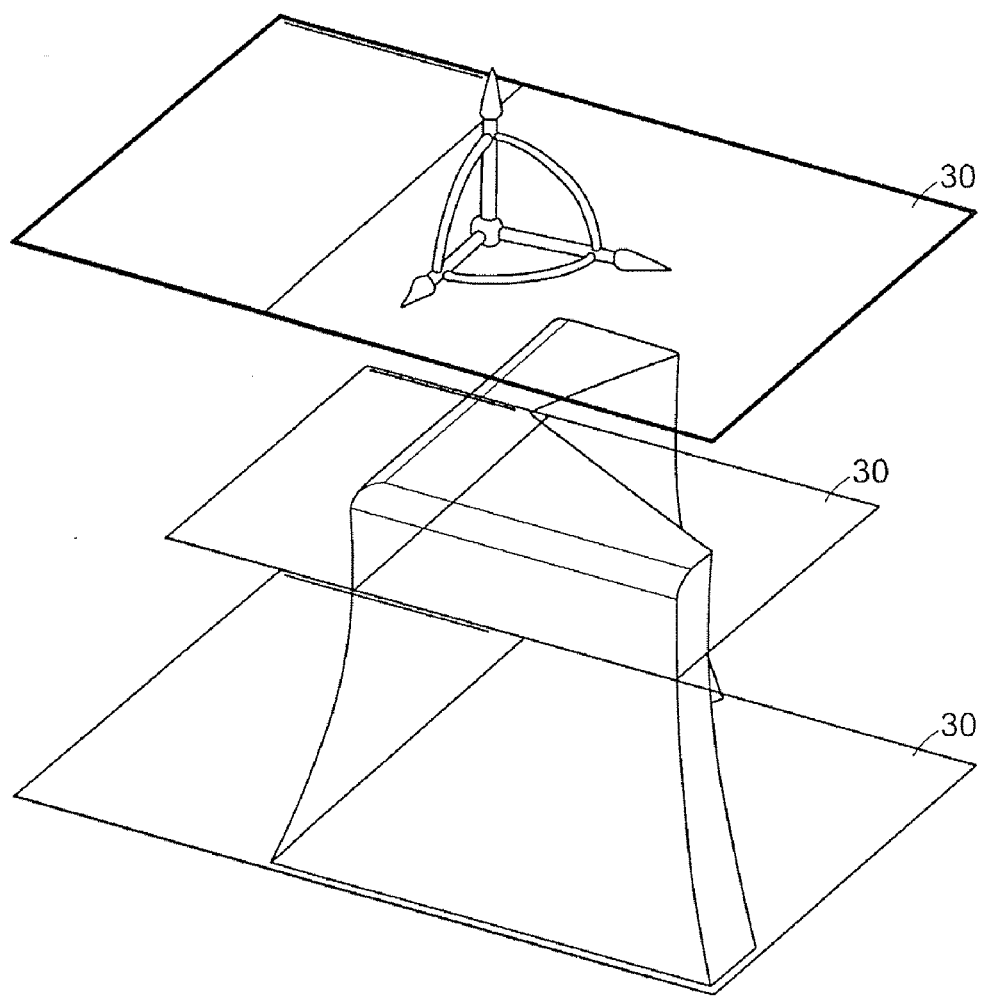
FIG. 6 shows the 2D cross sections derived by the tool from a cutout and rounded portion of a lofted surface.

Operation of the loft tool by a user will now be described with respect to FIGS. 4-17. FIGS. 4-6 show the overall system and how 2D sections are derived and displayed for a user. FIGS. 7-13 shows use of the various loft sub-tools that can be used to add/remove surfaces or section to the loft, and that can be used to modify sections making up the loft. FIGS. 14-17 show how the loft tool can be applied to an unlofted surface imported from another modeling system in a manner to a object in the native modeling system.

FIG. 4 shows a lofted objected 10 in a modeling system that can be modified by a loft tool in accordance with embodiments of the invention. The loft tool can be accessed through many methods, including use of a toolbar button 12 within the application window 13 of the overall CAD system. The part being manipulated 10 is shown in the middle of the application window. The part 10 includes multiple lofted surfaces 11.

FIG. 5 shows the 2D cross section derived by the loft tool when a lofted surface is selected. After selecting lofted surfaces 11 of an lofted object 10, the loft tool derives one or more 2D sections 20, 21, and 22 of the lofted object 10. The 2D section derived by the loft tool can now be modified.

The number of sections derived for an object depend on the object itself. In general the minimum number of sections needed to modify and object are presented. For example, for a cylinder, two sections are derived, one each for the top and bottom of the cylinder. Similarly, for a box with all side faces selected, a section for the top and the bottom of the box is derived. More generally, the number of section depends on the shape of the object, with a section being derived for each of the inflection points along the boundary of the lofted surface. In the example of a regularly shaped box or cylinder, since the lofted surfaces are flat or cylindrical, no additional sections are needed. For the pincushion shaped object of FIG. 5, 3 sections will be derived, one for each end, and an additional section at the middle (an inflection point) of the object. Similarly, for an hourglass shaped object, at least 5 such sections would be derived. The inflection points for the lofted surface can be derived from the u-v curves defining the lofted object. These u-v curves can be provided by the geometry engine as further described with respect to FIG. 18. Additional sections can be added or removed by the user as desired using the loft subtools as described with respect to FIG. 7.

FIG. 6 shows that loft tool can also derive the 2D sections 30, 31, and 32 of one or more portions of a lofted surface. These portions of the lofted surface can be manipulated in the same manner as the entire lofted surface, as if the entire surface were still visible.

Figure 7:
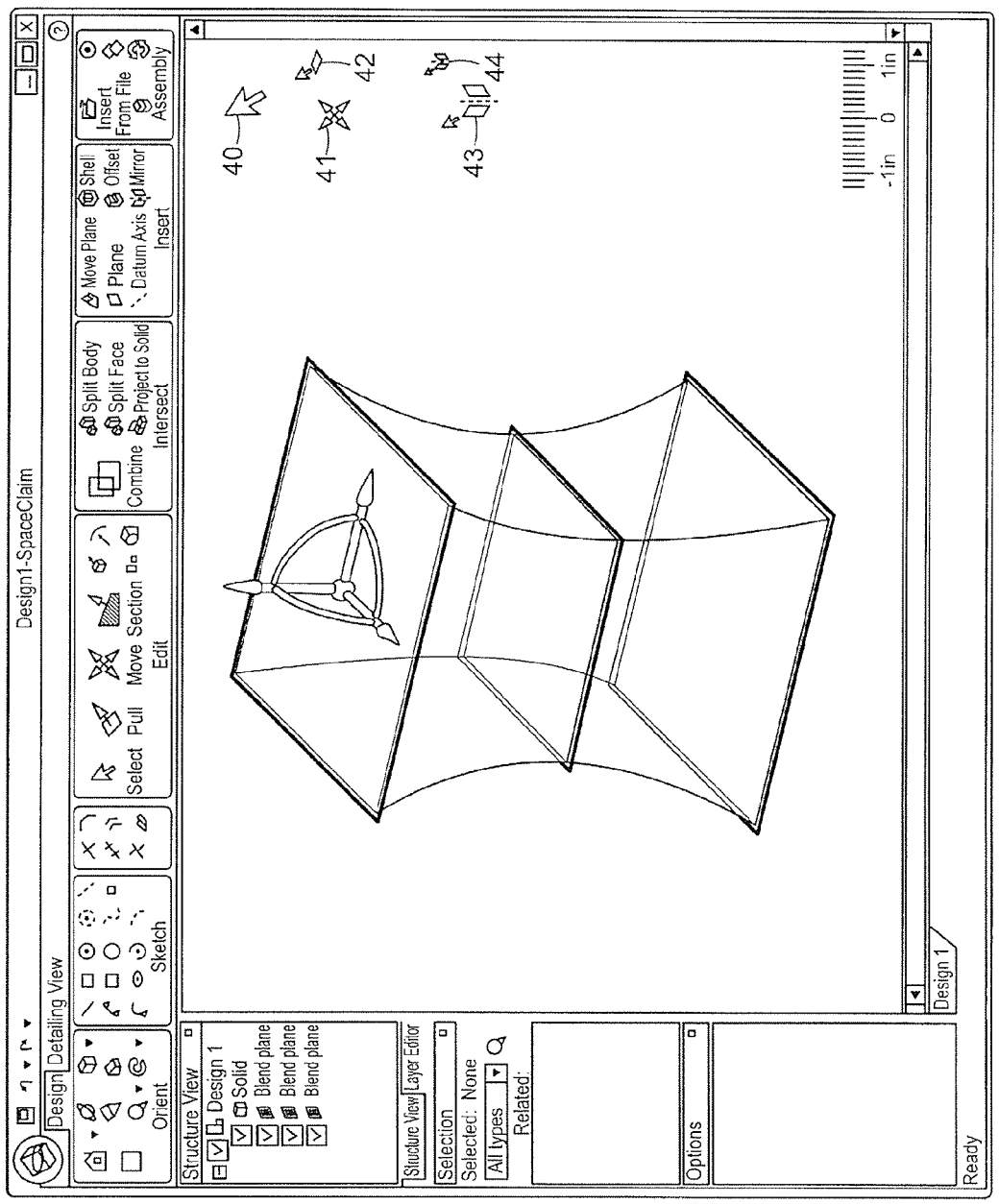
FIG. 7 shows the sub-tools of the loft tool.

FIG. 7 shows an embodiment of the invention where the loft tool is made up of subtools. These subtools can include a surface selector 40, a 2D section mover 41, a 2D section editor 42, a 2D section creator 43, and a 2D section remover 44. These sub-tools allow the complete and instant modification of any lofted surfaces or portions of lofted surfaces.

Figure 8:
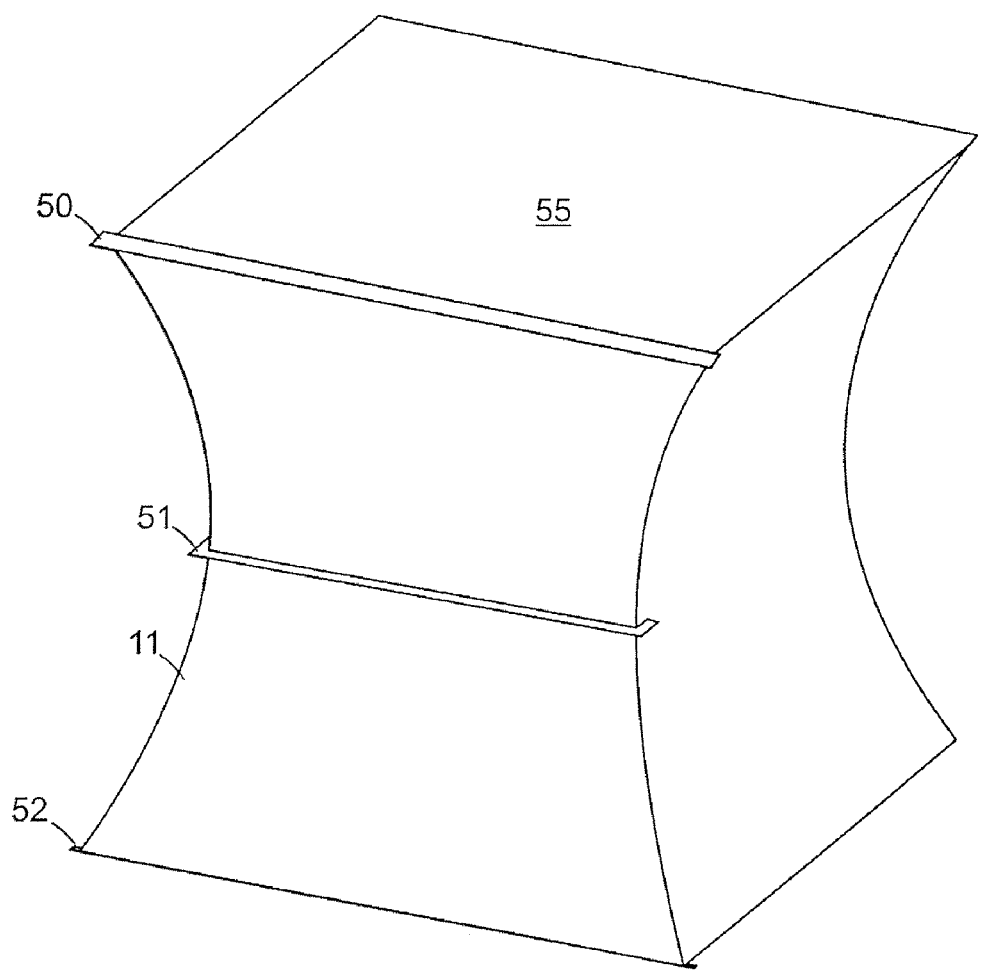
FIG. 8 shows the 2D sections re-derived after the use of the surface selector sub-tool.

FIG. 8 shows how the surface selector can be used to add or remove surfaces from the loft object. One the lofted object has been selected, and the 2D sections have been derived, the loft too displays the 2D sections of the lofted surface 50, 51, and 52. Using the surface selector tool 40, the user can Ctrl-clicks each surfaces of the lofted object to add it to or remove it from the selected set of surfaces. For some objects, such as a cylinder, only a single lofted surface needs to be selected. For other object, such as a box, at least two adjacent faces need to be selected by the user, otherwise the correct 2D sections could not be derived from the object. In general, at least one curvy surface or two flat surfaces need to be selected by a user.

Each change to the set of selected surfaces causes the loft tool to re-calculate and re-display the 2D sections. FIG. 8, shows that only a single surface 11 has been selected. This is shown by the highlighted section boundary 55 at the top of the object.

The 2D section remover subtool 44 can be used to delete any 2D section. After selecting the 2D section remover, the user clicks a 2D section to delete it. The lofted surface is regenerated to have the loft defined by the remaining 2D sections. The recalculation is done by requesting the new surface from the Geometry Engine with that curve removed from the definition of the surface.

Figure 9:
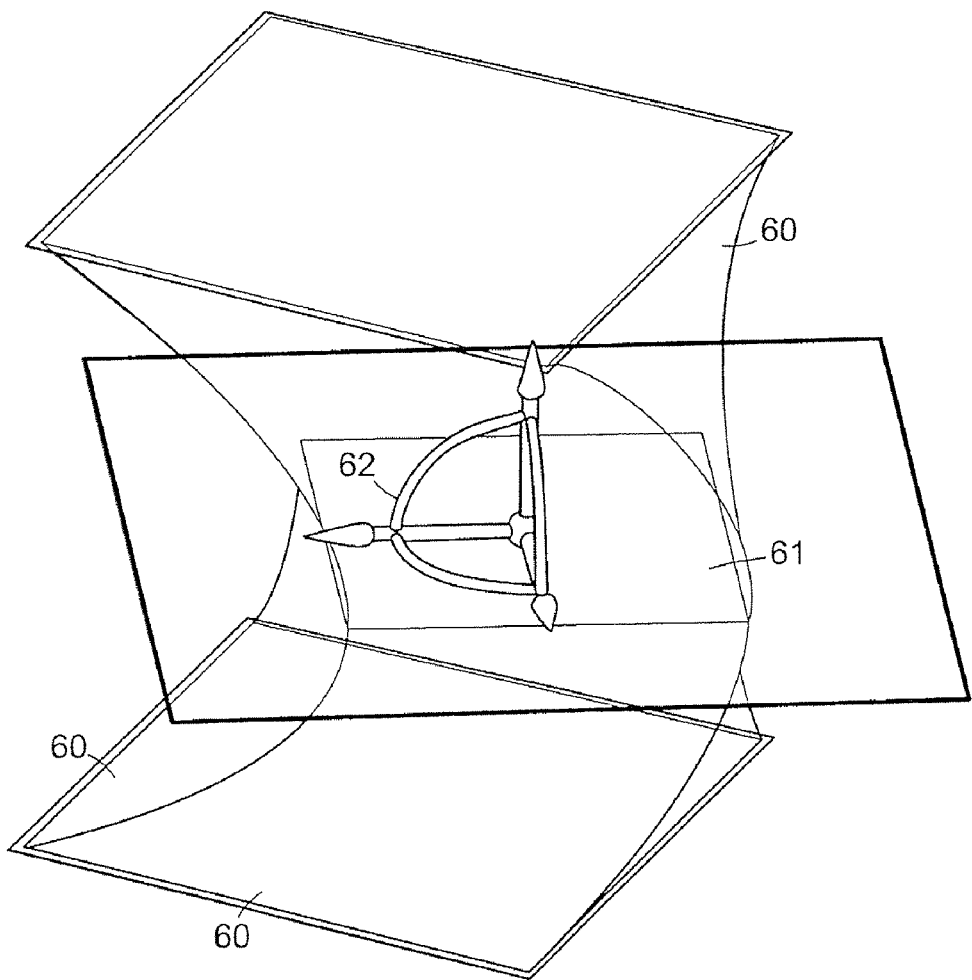
FIG. 9 shows the lofted surface from FIG. 2 after the 2D section mover sub-tool is used to move and rotate a plane.

FIG. 9 shows how the 2D section mover sub tool 41 can be used to translate or rotate the 2D sections in six directions without changing the edges or vertices of the 2D section. After selecting the 2D section mover sub-tool 41, the user clicks on the 2D section 61 to select it and then clicks and drags the manipulator 62 to move the 2D section to its new location and orientation. Each change causes the loft tool to re-calculate and re-display the lofted surfaces 60, so that the changes appear instantly. The geometry of the moved section is sent to the geometry engine so that a recalculation can be done. The recalculation is simplified since the same curves define the surface—just their location is different.

Figure 10:
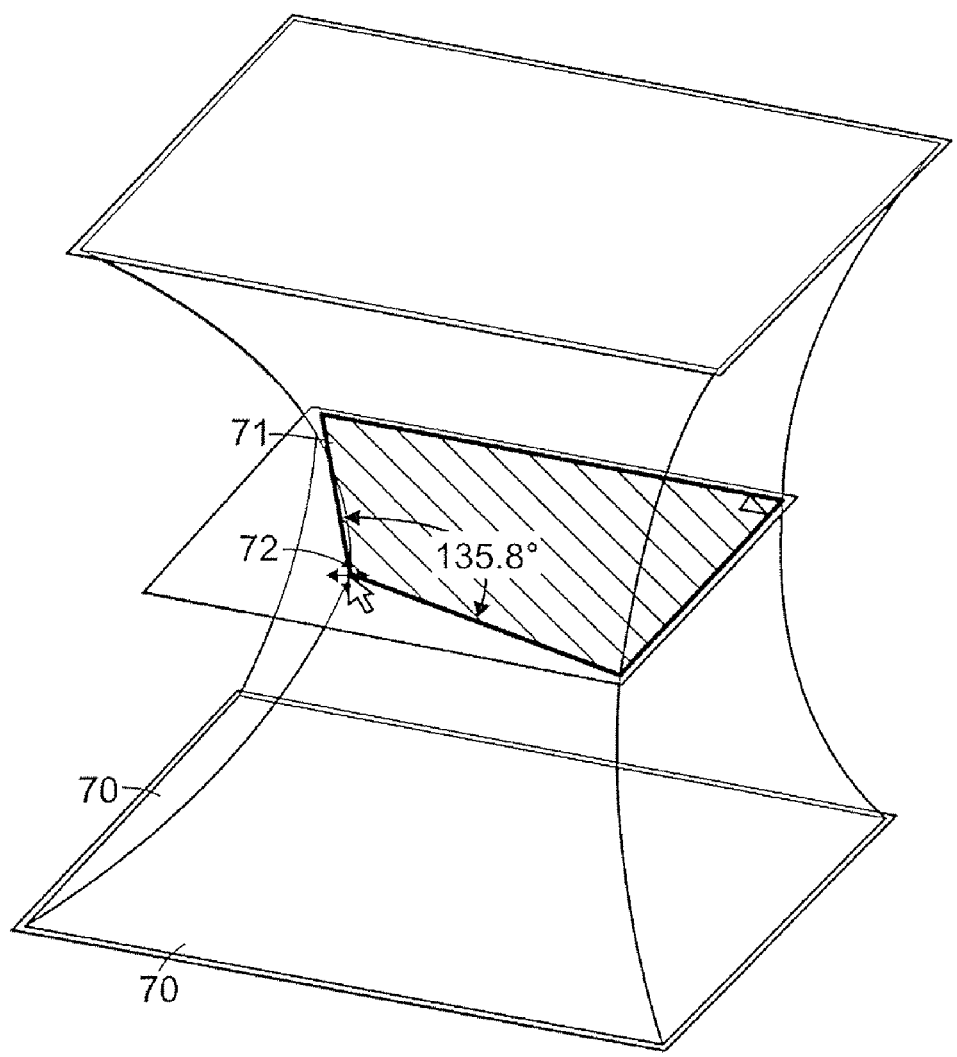
FIG. 10 shows the lofted surface from FIG. 2 after the 2D section editor sub-tool is used to move a vertex.

FIG. 10 shows how the 2D section editor 42 can be used to move the vertices of a 2D section 71. After selecting the 2D section editor sub-tool 42, the user clicks the 2D section 71 to select it, and then clicks a vertex 72 with the editor cursor and drags to move it to its new location. Each change causes the program to re-calculate and re-display the lofted surface 70, so that the changes appear instantly. The recalculation is done by requesting the new surface from the Geometry Engine based on the modified curves.

Figure 11:
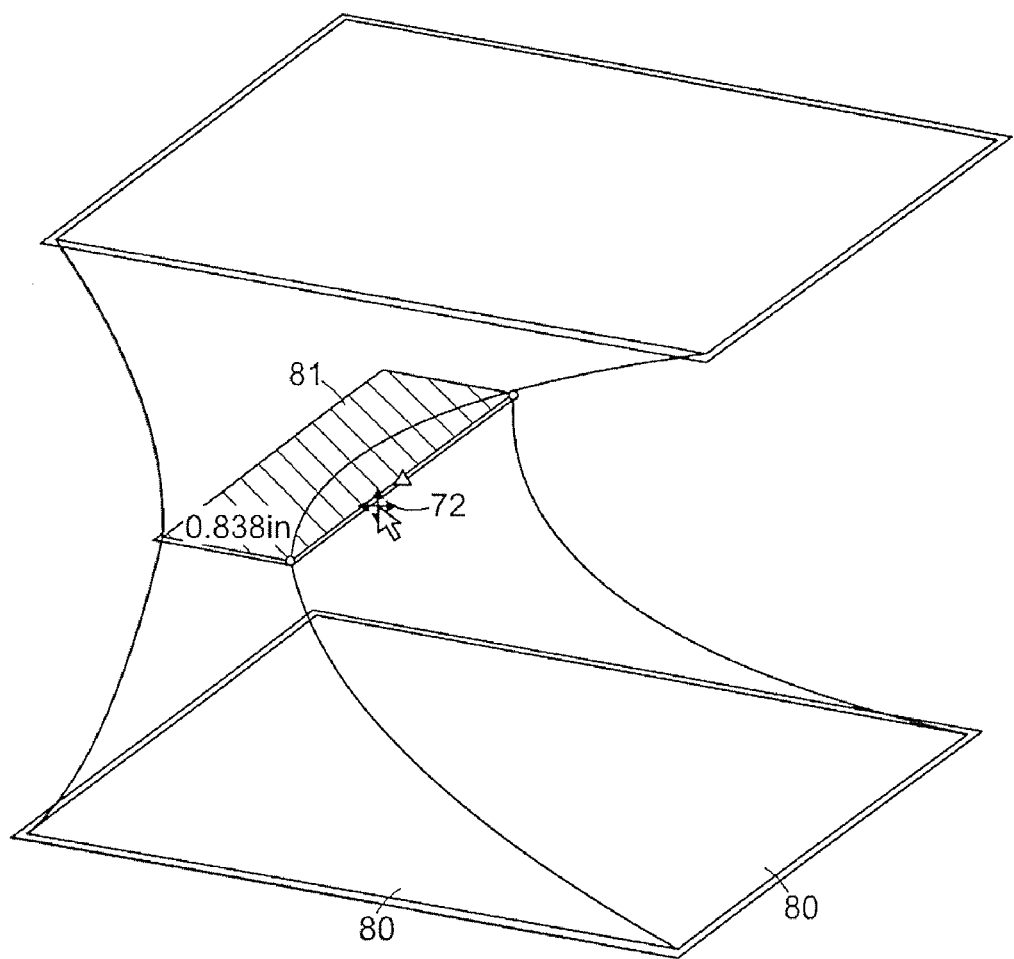
FIG. 11 shows the lofted surface from FIG. 2 after the 2D section editor sub-tool is used to move an edge.

FIG. 11 shows how the 2D section editor 42 can also be used to move the edges of the 2D section 81. After selecting the 2D section editor sub-tool 42, the user clicks the 2D section 81 to select it, then clicks an edge 83 with the editor cursor 72 and drags to move it to its new location. Each change causes the program to re-calculate and re-display the lofted surface 80, so that the changes appear instantly.

The 2D section editor can also be used to bend the edge of a 2D section. Bending an edge can be used to convert a straight line into an arc, or further shape an already existing arc. After selecting the 2D section editor sub-tool 42, the user right-clicks an edge, selects the Bend command from a context menu, and drags in or out to bend the edge. (The user can also select the Bend tool to bend the edge. In this context, Bend means the conversion of a straight line into an arc, an arc into a straight line, or to change the radius of an arc.) Each change causes the loft tool to re-calculate and re-display the lofted surface, so that the changes appear instantly.

Figure 12:
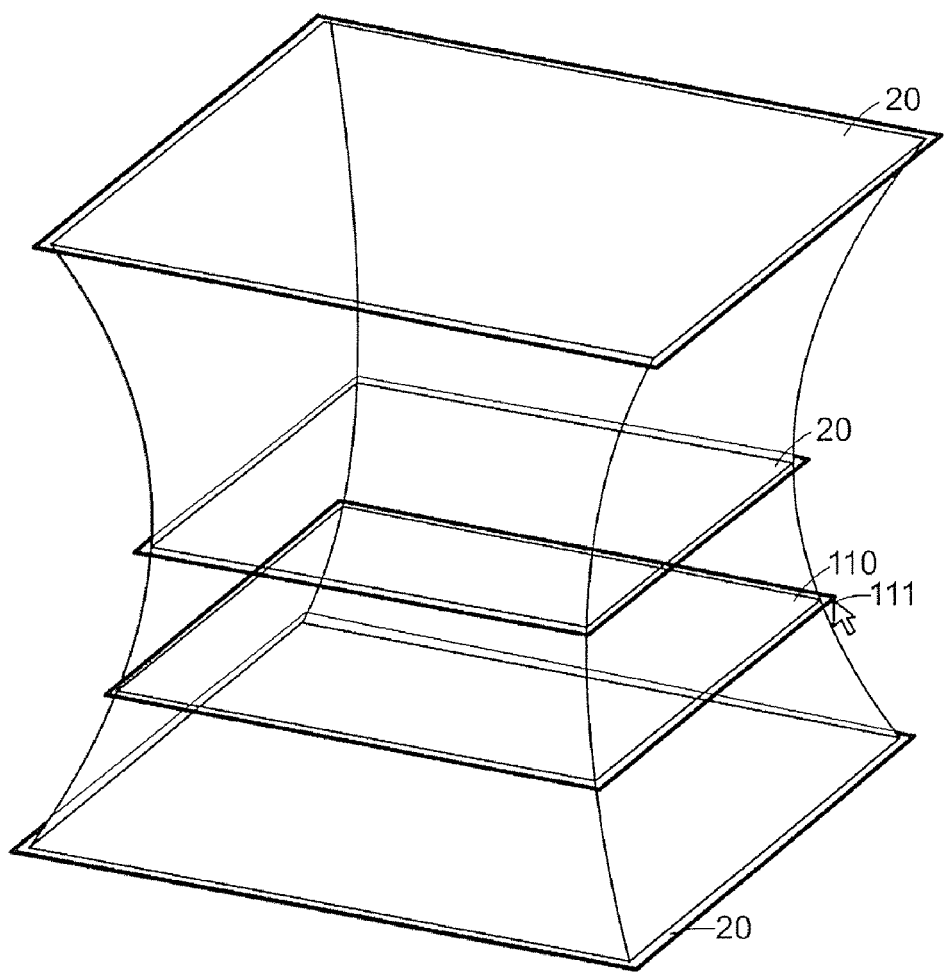
FIG. 12 shows the lofted surface from FIG. 2 after the 2D section creator sub-tool is used to insert a new 2D section.

FIG. 12 shows how the 2D section creator can be used to insert a new 2D section through a surface. After selecting the 2D section creator sub-tool, the user clicks the surface to insert a new 2D section 110 through the surface at that location 111. The orientation of the new 2D section is determined by the loft tool according to the orientations of the nearest existing 2D sections. When inserting a new section, the loft tool will bisect the angle of the existing 2D section on either side. In this way, the newly added section will roughly continue the shape of the lofted surface. As additional cross sections are added, the effect of a change of any one section to the entire lofted object will be less pronounced. This allows a user to have more precise and localized control over modifications.

Figure 13:
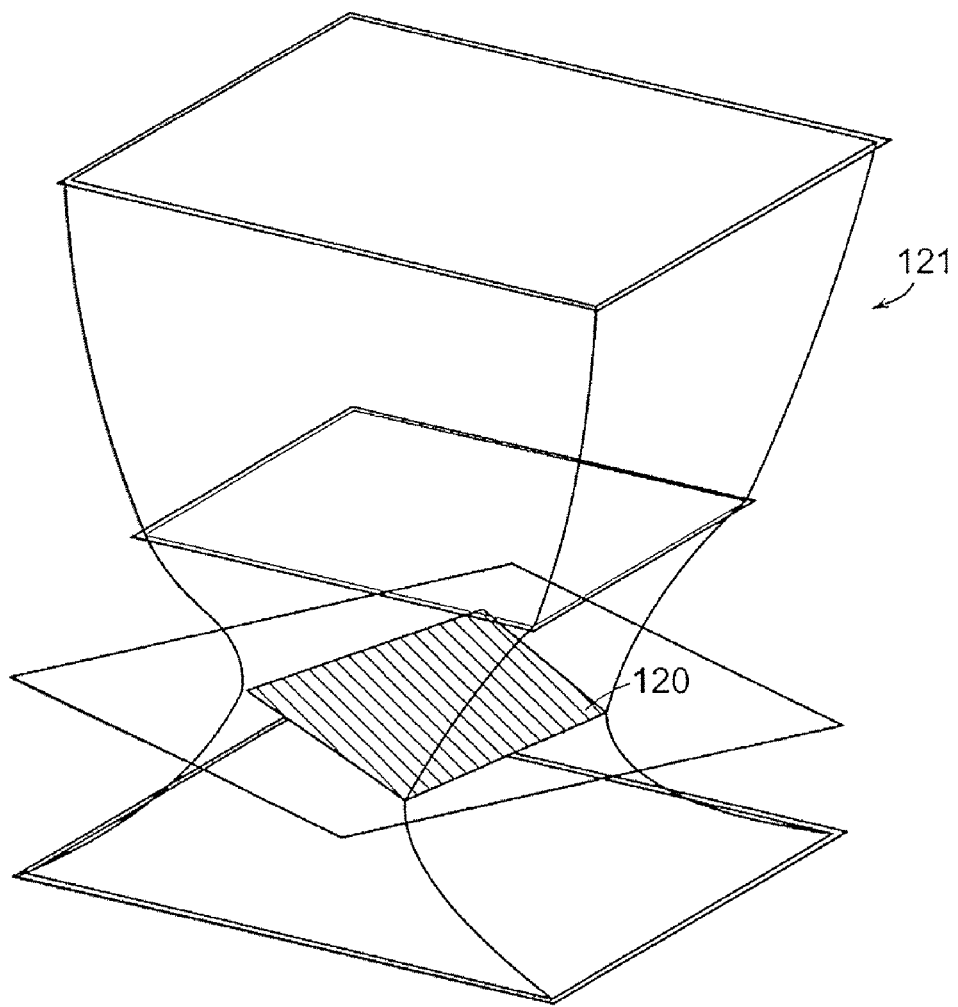
FIG. 13 shows the lofted surface from FIG. 11 after the 2D section mover and editor sub-tools are used to modify the newly inserted 2D section.

FIG. 13 shows how this newly inserted 2D section 110 can be modified using the mover or editor to produce a modified 2D section 120 and modified lofted surface 121. The recalculation is done by requesting the new surface from the Geometry Engine that includes the new defining curve. As show the modification affects to a greater extent the area around the section, and to a less extent the area further away.

Figure 14:
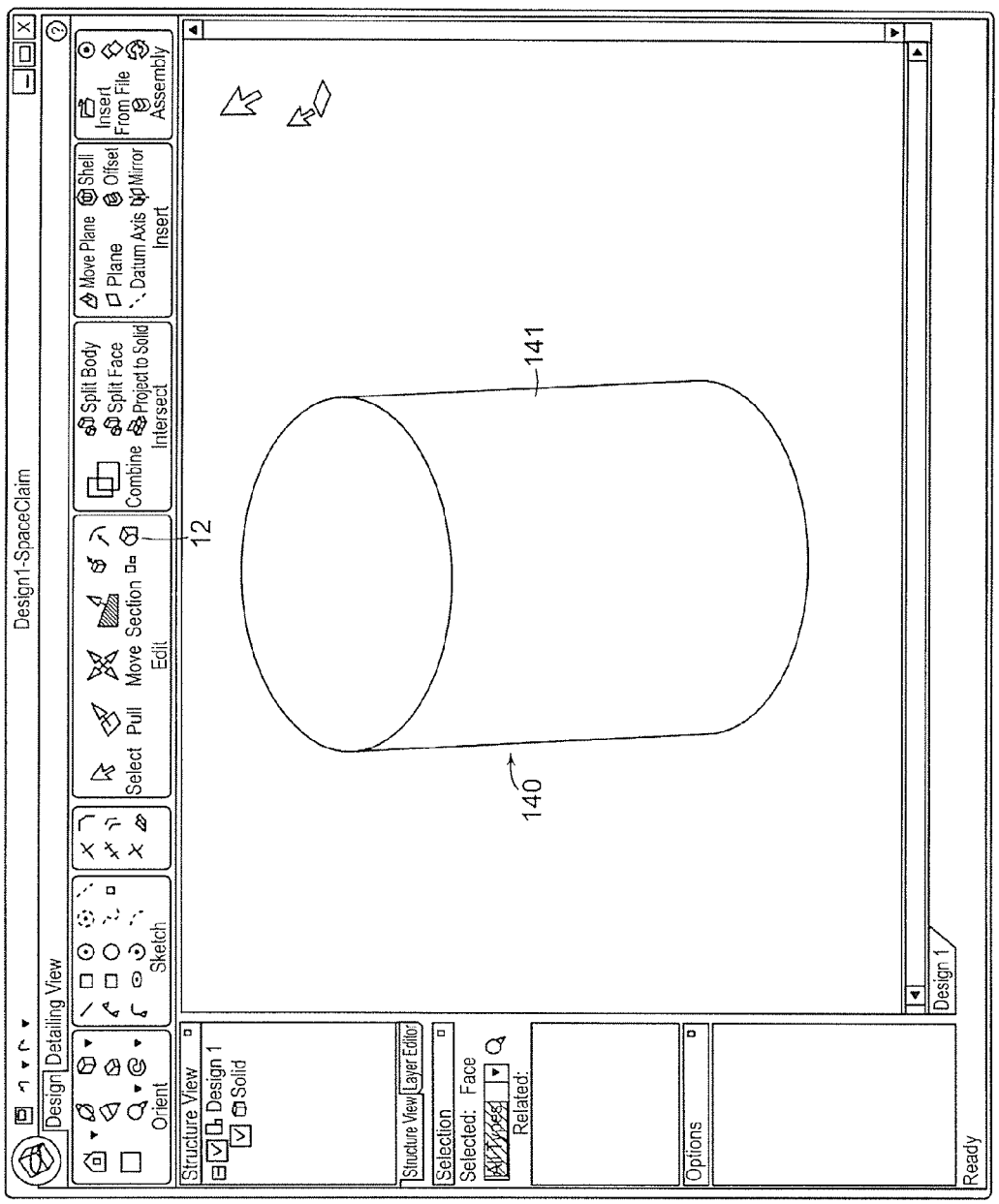
FIG. 14 is a three-dimensional modeling software application containing the tool and displaying a part with a selected, unlofted surface.

FIG. 14 shows how embodiments of the invention can be used to modify an unlofted surface. In FIG. 14 a part 140 is imported, loaded, or created. The part 140 includes the unlofted surface 141. The user selects the unlofted surface 141 to modify (or multiple surfaces depending on the part), and then selects the loft tool 12.

Figure 15:
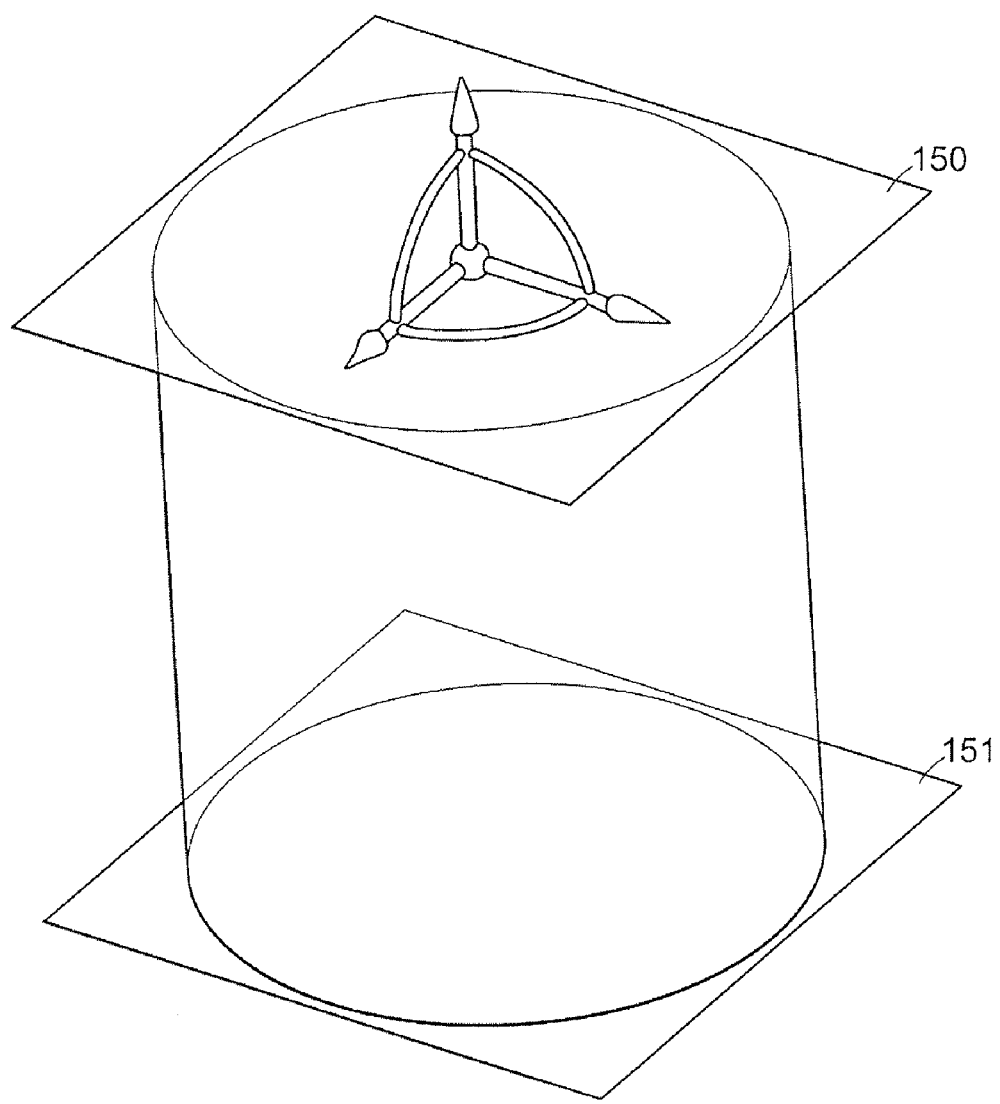
FIG. 15 shows the 2D cross sections derived from the unlofted surface in FIG. 14.

FIG. 15 shows that even for an imported object, which has now been converted to a geometry-only format, the program can derive the 2D sections 150 and 151 that comprise the surface.

Figure 16:
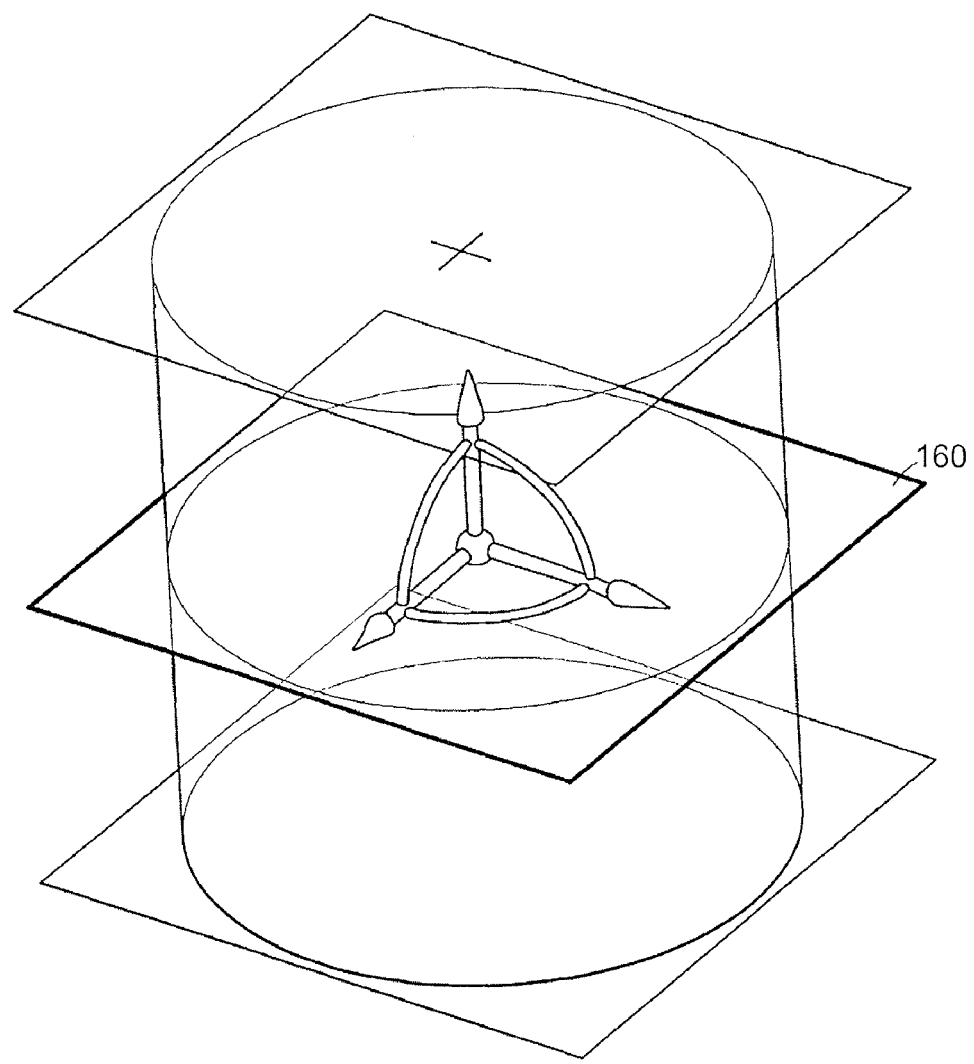
FIG. 16 shows the unlofted surface from FIG. 14 after the 2D section creator sub-tool is used to create a new 2D cross section through the surface.

FIG. 16 shows how a user can create one or more new 2D sections 160 with the 2D section creator sub-tool 43. The process is similar to that described above for an already lofted object, where the loft told generates the new section based on the nearest other sections.

Figure 17:
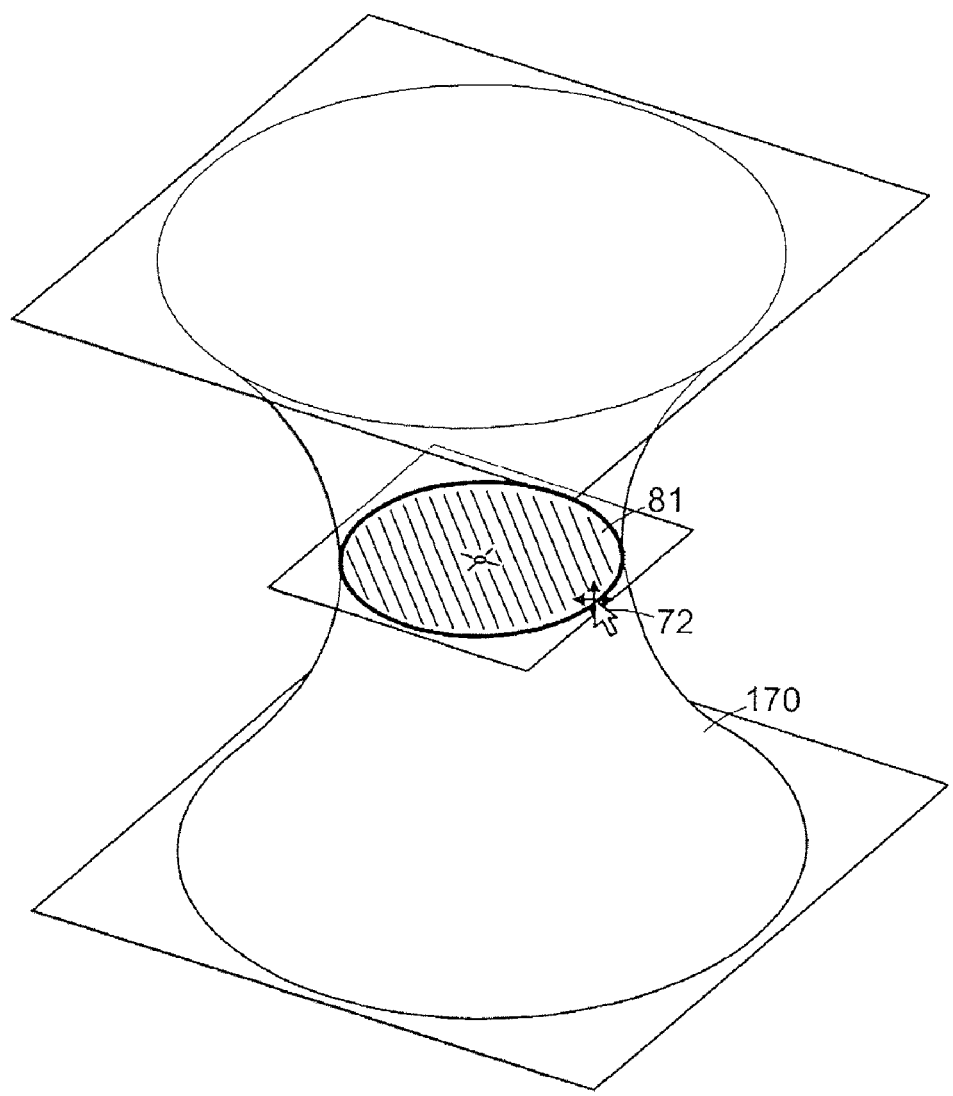
FIG. 17 shows the lofted surface created from the unlofted surface in FIG. 14 using the 2D section editor sub-tool.

FIG. 17 shows how the new section 81 can be modified to change to lofted part 170. In this example, the circular cross section that was added, has had its diameter reduced. The regenerated lofted object is shown now with a necked-down shape that corresponds to the reduced diameter section.

Figure 18:
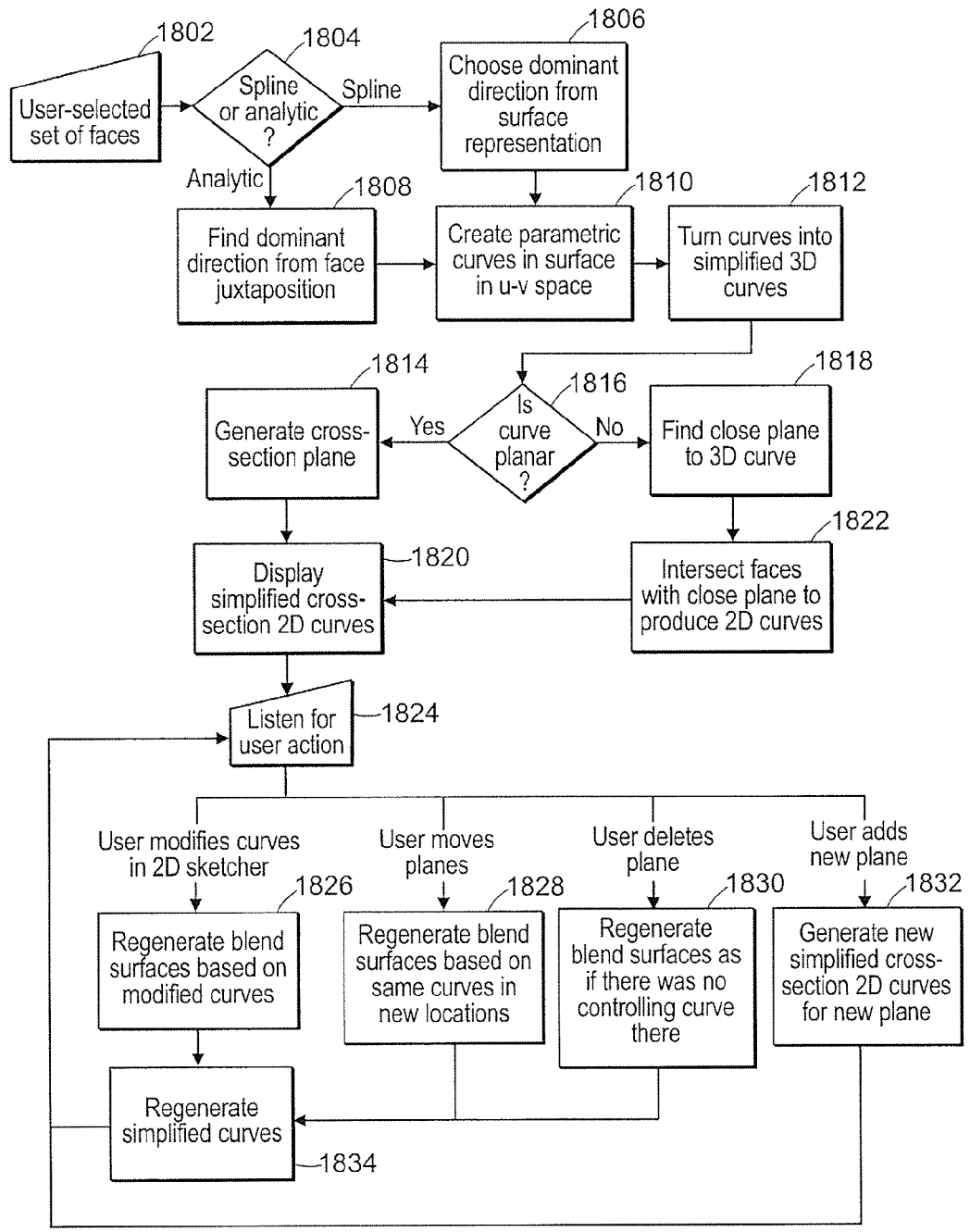
FIG. 18 describes back end logic for implementation for the loft tool.
Figure 19:
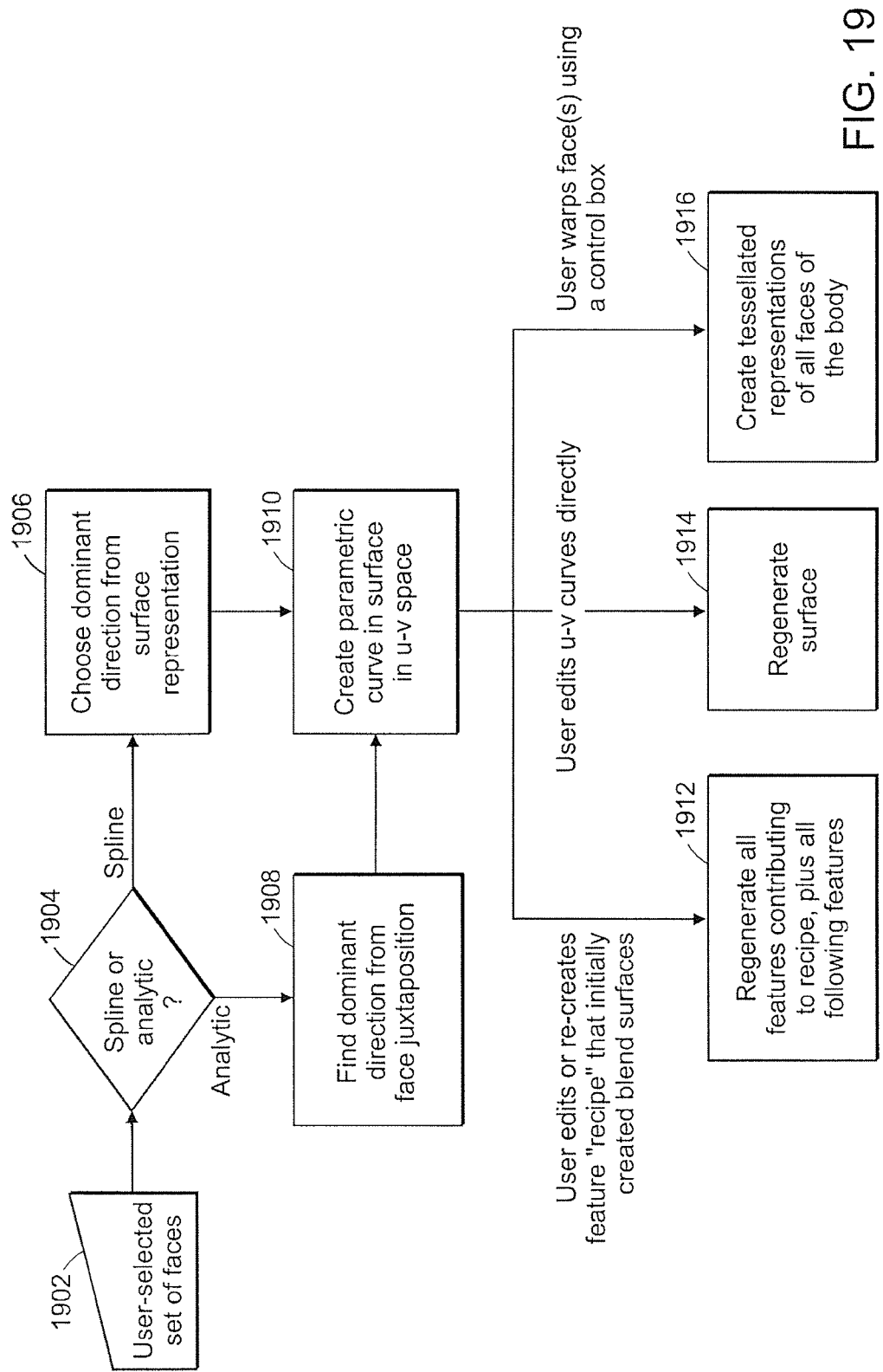
FIG. 19 shows the logic used by a prior art system edit lofted surfaces.

FIG. 18 describes further details and the backend implementation of the loft tool. The loft tool provides the logic and algorithms that provide an interface between the geometry engine and the user.

Regardless of whether the loft tool is being used with a newly created object, an existing object, or an object from another CAD system; the modeling system using the foundation layer the geometry engine 1920 converts the imported data from the originating application into a geometry-only format. This comprises stripping all history and feature data, so that the source of the geometry data has no influence. The geometry engine also performs all conversion, checking, and geometry calculation functions. On import, the CAD system retrieves only the final definition of the geometry, and places it into the object database 222. The CAD system, creates a new, persistent file with the File Storage component 224. If the geometry was imported from another system, the history and parameters used to create the final geometry in that software are ignored.

Importing and translation of outside geometry can be performed by the geometry engine through its built in translators. After import of outside geometry, the geometry only data is provided to higher level layers of the system. Although history information and other data from parametric systems has been removed, the geometry still retains information about primitives and relations between objects in the imported geometry.

At step 1802, the user selects a lofted surface or surfaces 11 to modify (e.g. translate, rotate, modify and edge, modify one or more vertices as shown in FIGS. 7-13). At this point the loft tool begins the process of deriving and displaying the 2D sections that comprise the lofted surface (e.g. section 20, 21, and 22 of FIG. 5).

At step 1804 the loft tool sends the mathematical description of the selected surface or surfaces to the Geometry Engine 220 with a query to determine if the surface is spline or analytic. Analytic surfaces are simpler, as they have a precise mathematical definition, such as, a cone, a plane, a sphere, or a cylinder. Spline surfaces have a more complicated mathematical description.

In either case, the surface selected by the user is defined mathematically as a "support surface" in which the face of the lofted object is contained. The face is defined by the support surface, and the boundaries of the lofted object on this support surface. This support surface provides a basis for analysis by the geometry engine.

The geometry engine analyzes each submitted support surface and determines if it is a spline or analytic surface. This can be determined from the geometry model data stored in object database 222. Based on this determination, the geometry engine can determine the dominant direction of the face. At step 1806 the dominant direction is determined for a spline by measuring the longest side of the surface using a surface representation.

At step 1808 the dominant direction is determined for an analytic surface by measuring the longest side of the surface using a face juxtaposition method. Determination of the dominant direction of the selected faces is used to determine how the 2D sections should be oriented relative to the lofted surface.

At step 1810, the loft tool then requests the grid of u-v curves that define the lofted surface from the geometry engine. The u-v curves are a set of mathematical descriptions of the boundaries of the lofted surface. For example, for a cylinder, these u-v curves would be a straight line, and the equation of a circle. For a box, it would be a set of curves for the four sides defining the shape of the box. Because at least two sides of the box need to be selected by the user using the loft tool, the geometry engine can determine the other sides of the box. The geometry engine is able to provide these u-v mathematical descriptions based on the geometry data in the object database 222.

Next, at step 1812 the loft tool calculates the 3D representation of the u-v curves, simplifying them into straight lines, arcs, or splines. First, the u-v curves are converted into x-y-z curves in the model space. This conversion can be done by the geometry engine using the u-v curves and the information about the curves orientation and location in the model space that is in the object database 222.

These x-y-z curves are then sampled and compared against straight lines, arcs, or splines, until a match is found. A match can be determined by use of a tolerance that defines how close the x-y-z curve must be to one of the simplified curves to be considered a match. The comparison can be done by first comparing the simplest of the simplified curves (e.g. a line) before a more complicated one, ensuring that the simplest possible representation that is sufficient is used. The simplified x-y-z curves now define the boundaries of the lofted surface, in the x-y-z coordinates of the model space.

Once the simplified curves has been determined at step 1812, then at step 1816, the loft tool queries the geometry engine 220, providing the 3D representation of the curves, to determine whether each of these 3D curves that defined the lofted surface are planar or not. A lofted surface must be decomposable into only planar curves to be manipulated within the software.

At step 1818 the Geometry Engine calculates what the closest plane would be to each of the nonplanar 3D curves and redefines the curves on that new plane. The closest plane can be determined by the finding the best fit plane through the 3D points that define the simplified curve, and then projecting the curve onto that plane. Some points on the 3D curve may be above the best fit plane, while other 3D points may be below the best fit plane, but by projecting all those points onto a plane, the best fit plane can be determined. The determination of what is best fit can be done through any number of known methods. This process is repeated for each non-planar curve of the lofted surface, until all the curves that define the lofted surface are planar, or a best fit plane for each non-planar curve has be found.

Once a set of best fit planes have been defined, at step 1822 an intersection of the appropriate faces of the lofted surface and the best fit planes is performed. The correct faces can be determined based on the dominant direction of the lofted surface determined earlier at steps 1086 and 1808. This intersection will generate a planar (2D) set of cross sections bounded at least by the faces of the loft surface. The intersection analysis can also use a tolerance to determine what points form the intersection between the best fit planes and the selected faces of the lofted surface. Additional 2D cross sections can be generated as needed at different inflection points using the initial orientation of the best fit plane.

At step 1814, if the simplified curves are planar curves (e.g. the top of a cylinder) then a cross section plane is generated directly by the geometry engine as the intersection of the planar 3D curves and the appropriate faces of the lofted surface. Additional 2D cross section can be generated as needed at different inflection points using the simplified planar curves.

At step 1820 the simplified 2D cross sections generated by the intersection operations of steps 1814 and 1822 are displayed for manipulation by the user. The manipulation of these 2D cross sections and their defining data, as described above, can be used to change the defining data for 3D surfaces that form the lofted surface. For example, when reducing the diameter of a circular cross section of a cylindrical lofted surface, the system will modify the geometry data defining the long direction of the cylinder. The points closest to cross section will be modified most, while those further away will be modified less. As shown in the figures, reducing a cross section at the top of a cylindrical lofted surface will result in a cone, while reducing the cross section in the middle of the cylindrical surface will result in a necked-down shape.

At step 1824 the system listens and waits for user modifications. At step 1826, modified curves are processed by receiving new geometry for modified curves based on user modifications as described in FIGS. 7-13. The new geometry is provided to the geometry engine so that the surfaces can be regenerated. At step 1834 the simplified cross section curves are regenerated so that they can be rendered and further manipulated by the user. Similarly, translations are processed by the geometry engine at step 1828, deletions are handled at step 1830, and new planes are handled at 1832.

Accordingly the reader will see that, according to one embodiment of the invention, we have provided a tool within a three-dimensional modeling software application that, given any lofted surface or portion of a lofted surface, derives the 2D sections used to create the loft. Then it allows the addition of new 2D sections and the modification of both new and existing 2D sections to modify the loft. The loft tool also allows new 2D sections be added to any surface, allowing lofts to be created from unlofted surfaces.

While the above description contains many specificities, these should not be construed as limitations on the scope of any embodiment, but as exemplifications of the presently preferred embodiments thereof. Many other ramifications and variations are possible within the teachings of the various embodiments.

What is claimed is:

1. A method for modifying the geometry data of a lofted surface that is represented as a geometry-only format object stored within a computer aided design modeling system and without related history information, through manipulation of an x-y-z representation of a set of two dimensional planar cross sections derived from a u-v representation of the lofted surface comprising:
   (a) receiving a selection from a user of the computer aided design modeling system, of at least one face of the lofted surface;
   (b) determining the dominant direction of the lofted surface based on the at least one selected face of the lofted surface;
   (c) generating a plurality of u-v curves defining the lofted surface in response to the user's selection of at least one face of the lofted surface, wherein the u-v curves are generated from the geometry data of the lofted surface;
   (d) converting the plurality of u-v curves defining the lofted surface to a plurality of three dimensional x-y-z curves;
   (e) simplifying the plurality of three dimensional x-y-z curves into a set of simplified three dimensional x-y-z curves, wherein each of the simplified three dimensional x-y-z curves is a curve selected from a relatively small set of geometric shapes;
   (f) planarizing the set of simplified three dimensional x-y-z curves into a set of planar two dimensional simplified curves;
   (g) generating a set of two dimensional cross sections from the intersection of the planar two dimensional simplified curves and the lofted surface, wherein the two dimensional cross sections define the lofted surface, and wherein the two dimensional cross sections are actionable surfaces capable of having their geometry data directly modified, such modifications capable of being translated into geometry modifications of the lofted surface;
   (h) receiving a user action and geometry modification to at least one of the two dimensional cross sections defining the lofted surface; and
   (i) updating the geometry data of the lofted surface, without recording history information, in accordance with the user's modification to the geometry of the at least one simplified two dimensional cross sections generated from the u-v representation of the lofted surface.

2. The method of claim 1, wherein the geometry modification to the at least one of the two dimensional cross sections is at least one of a translation, rotation, edge modification, and vertex modification.

3. The method of claim 1, wherein determining the dominant direction of the lofted surface based on the at least one selected face comprises measuring the longest side of the lofted surface using a surface representation.

4. The method of claim 1, wherein the relatively small set of geometric shapes comprise at least one of a line, arc, and spline.

5. The method of claim 4, wherein simplifying the plurality of three dimensional x-y-z curves into a set of simplified three dimensional x-y-z curves comprises, for each three dimensional x-y-z curve, sampling a plurality of points on the three dimensional x-y-z curve and comparing the plurality of points against at least one of a line, arc, and spline.

6. The method of claim 1, planarizing the set of simplified three dimensional x-y-z curves into a set of planar two dimensional simplified curves comprises calculating a closest plane to each of the non-planar simplified 3D curves.

7. The method of claim 1, updating the geometry data of the lofted surface, without recording history information, in accordance with the user's modification to the geometry of the at least one simplified two dimensional cross sections generated from the u-v representation of the lofted surface, is done instantaneously.

8. The method of claim 1, wherein generating a two dimensional cross section from the intersection of a planar two dimensional simplified curve and the lofted surface is done at each inflection point along the dominant direction of the lofted surface.

9. A system for modifying the geometry data of a lofted surface that is represented as a geometry-only format object stored within a computer aided design modeling system and without related history information, through manipulation of an x-y-z representation of a set of two dimensional planar cross sections derived from a u-v representation of the lofted surface comprising
   a loft tool for selection of at least one face of a geometry-only lofted surface, wherein the loft tools determines the dominant direction of the lofted surface based on the at least one selected face;
   a geometry engine for generating a plurality of curves defining the lofted surface, in response to the selection, from the geometry data of the lofted surface, converting the plurality of u-v curves defining the lofted surface to a plurality of three dimensional x-y-z curves, wherein each of the simplified three dimensional x-y-z curves is a curves selected from a relatively small set of geometric shapes;
   the loft tool planarizing the set of simplified three dimensional curves into a set of planar two dimensional curves and generating a set of two dimensional cross sections from the intersection of the planar two dimensional simplified curves and the lofted surface, wherein the two dimensional cross sections define the lofted surface, and wherein the two dimensional cross sections are actionable surfaces capable of having their geometry data directly modified, such modifications capable of being translated into geometry modifications of the lofted surface;
   a user interface for displaying the set of two dimensional cross sections defining the lofted surface and generated by the geometry engine from an intersection of each of the planar two dimensional curves and the lofted surface;
   the user interface receiving a user action and geometry modification to the at least one two dimensional cross section defining the lofted surface; and updating the geometry data of the lofted surface without recording history in accordance with the user's modification to the geometry of the at least one simplified two dimensional cross section generated from the u-v representation of the lofted surface.

10. The system of claim 9, wherein the modification to the 2D section is at least one of a translation, rotation, edge modification, and vertex modification.

11. The system of claim 9, wherein the simplified 3D curves comprise at least one of a line, arc, and spline.

12. The system of claim 11, wherein simplifying the plurality of x-y-z curves into simplified 3D curves comprises, for each x-y-z curve, sampling a plurality of points on the x-y-z curve and comparing the plurality of points against at least one of a line, arc, and spline.

13. The system of claim 9, generating a plurality of planar simplified 3D curves comprises calculating a closest plane to each of the non-planar simplified 3D curves.

14. The system of claim 9, wherein a 2D cross section is generated at each inflection point along the dominant direction of the lofted surface.

15. A computer program product for modifying the geometry data of a lofted surface that is represented as a geometry-only format object stored within a computer aided design modeling system and without related history information, through manipulation of an x-y-z representation of a set of two dimensional planar cross sections derived from a u-v representation of the lofted surface comprising:

(a) receiving a selection from a user of the computer aided design modeling system, of at least one face of the lofted surface;

(b) determining the dominant direction of the lofted surface based on the at least one selected face of the lofted surface;

(c) generating a plurality of u-v curves defining the lofted surface in response to the user's selection of at least one face of the lofted surface, wherein the u-v curves are generated from the geometry data of the lofted surface;

(d) converting the plurality of u-v curves defining the lofted surface to a plurality of three dimensional x-y-z curves;

(e) simplifying the plurality of three dimensional x-y-z curves into a set of simplified three dimensional x-y-z curves, wherein each of the simplified three dimensional x-y-z curves is a curve selected from a relatively small set of geometric shapes;

(f) planarizing the set of simplified three dimensional x-y-z curves into a set of planar two dimensional simplified curves;

(g) generating a set of two dimensional cross sections from the intersection of the planar two dimensional simplified curves and the lofted surface, wherein the two dimensional cross sections define the lofted surface, and wherein the two dimensional cross sections are actionable surfaces capable of having their geometry data directly modified, such modifications capable of being translated into geometry modifications of the lofted surface;

(h) receiving a user action and geometry modification to the at least one of the two dimensional cross sections defining the lofted surface; and (i) updating the geometry data of the lofted surface, without recording history information, in accordance with the user's modification to the geometry of the at least one simplified two dimensional cross sections generated from the u-v representation of the lofted surface.

16. The computer program product of claim 15, wherein the geometry modification to the at least one of the two dimensional cross sections is at least one of a translation, rotation, edge modification, and vertex modification.

17. The computer program product of claim 15, wherein determining the dominant direction of the lofted surface based on the at least one selected face comprises measuring the longest side of the lofted surface using a surface representation.

18. The computer program product of claim 15, wherein the relatively small set of geometric shapes comprise at least one of a line, arc, and spline.

19. The computer program product of claim 18, wherein simplifying the plurality of three dimensional x-y-z curves into a set of simplified three dimensional x-y-z curves comprises, for each three dimensional x-y-z curve, sampling a plurality of points on the three dimensional x-y-z curve and comparing the plurality of points against at least one of a line, arc, and spline.

20. The computer program product of claim 15, wherein generating a two dimensional cross section from the intersection of a planar two dimensional simplified curve and the lofted surface is done at each inflection point along the dominant direction of the lofted surface.

\* \* \* \* \*